United States Patent [19]

Burison

[11] Patent Number: 5,652,677
[45] Date of Patent: Jul. 29, 1997

[54] LIGHT REFLECTING BICYCLE SAFETY APPARATUS

[76] Inventor: Scot Burison, 1027 Fulton Ave. #152, Sacramento, Calif. 95825

[21] Appl. No.: 727,130

[22] Filed: Oct. 8, 1996

Related U.S. Application Data

[63] Continuation-in-part of Ser. No. 308,563, Sep. 19, 1994, abandoned.

[51] Int. Cl.$^6$ .................................................. G02B 5/12
[52] U.S. Cl. .......................... 359/523; 359/515; 359/522; 301/37.41
[58] Field of Search ............................... 359/523, 524, 359/533; 301/37.41

[56] References Cited

U.S. PATENT DOCUMENTS

| | | | |
|---|---|---|---|
| 3,310,357 | 3/1967 | Hogan | 359/523 |
| 3,684,347 | 8/1972 | Challe et al. | 359/523 |
| 3,894,786 | 7/1975 | Nagel | 359/523 |
| 3,894,790 | 7/1975 | Golden et al. | 359/523 |
| 3,895,855 | 7/1975 | Nagel | 359/524 |
| 3,924,928 | 12/1975 | Trimble | 359/523 |
| 4,140,368 | 2/1979 | Sundahl | 359/523 |
| 4,178,070 | 12/1979 | Thibodeau, Sr. | 359/523 |
| 4,718,743 | 1/1988 | Leitzke | 359/523 |
| 5,353,153 | 10/1994 | Craig | 359/523 |

FOREIGN PATENT DOCUMENTS 2430346  3/1980  France .................................. 359/523

Primary Examiner—Timothy P. Callahan
Assistant Examiner—Kenneth B. Wells
Attorney, Agent, or Firm—John P. O'Banion

[57] ABSTRACT

A spoke mounted bicycle reflector having first, second, and third reflective members. The first reflective member has two, generally parallel, reflective faces. The second and third reflective members have two, generally parallel, faces but only one face of each is reflective. The second and third reflective members extend outward from the first reflective member so that the faces of the second and third reflective members are in a substantially perpendicular orientation to the faces of the first reflective member, and so that the longitudinal axis of each is aligned with the longitudinal axis of the first reflective member. The mount of outward extension of the second and third reflective members can be fixed or slidably adjustable in position in relation to the first reflective member. The first and second reflective members produce a mono-directional flashing effect when the wheel is rotated in the presence of a light source. From the rear of the bicycle, the strobe-like flashing appears to move upward; from the front of the bicycle, the strobe-like flashing appears to move downward. As result, a change in direction of the bicycle can be clearly seen, particularly from the front to rear as the tires and reflectors become offset when turning.

34 Claims, 7 Drawing Sheets

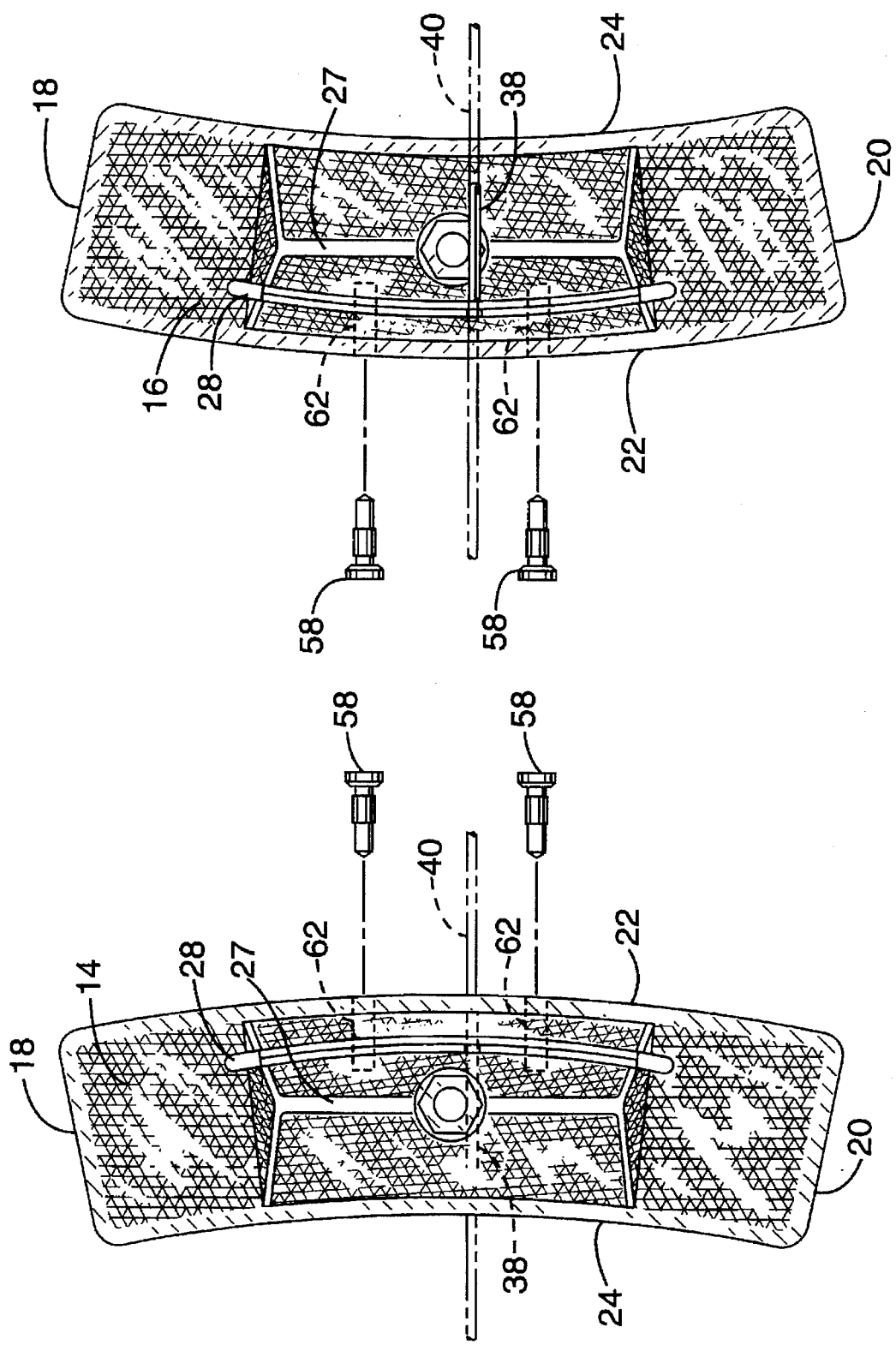

LIGHT REFLECTING BICYCLE SAFETY APPARATUS

CROSS REFERENCE TO RELATED APPLICATIONS

This application is a continuation-in-part of application Ser. No. 08/308,563 filed on Sep. 19, 1994, now abandoned.

BACKGROUND OF THE INVENTION

1. Field of the Invention

This invention pertains generally to bicycle reflectors, and more particularly to a spoke mounted light reflecting apparatus which includes reflective wings of adjustable width projecting outward to provide from and rear oriented reflective surfaces.

2. Description of the Background Art

A reflector is extensively used as safety apparatus for wheeled vehicles such as bicycles to warn motor vehicle operators of the presence of the cyclist. Reflectors typically are small, flat devices having surfaces which reflect light from the headlights of vehicles such as automobiles and trucks, and thus warn the vehicle drivers of the bicycle location.

While reflectors are frequently mounted to the frame portion of a bicycle, it is generally more desirable to mount reflectors on the bicycle wheels since the reflectors move with the wheels when the bicycle is in use and provide a flashing or stroboscopic effect, thereby drawing additional attention to the bicycle and providing additional warning to vehicle drivers. Reflectors located near the rim of the wheel undergo the most motion and provide the best visibility.

One problem experienced with wheel mounted bicycle reflectors is poor visibility from the front and rear of the bicycle due to the wheel rim and tire blocking light from those directions. Wheel mounted reflectors generally have only good side visibility because the reflectors must be attached within the plane of the wheel to fit between the forks of the bicycle frame. Front and rear visibility is important since motor vehicles will usually be in alignment with the front or rear of a bicycle when sharing the same road, and thus wheel mounted reflectors will only be visible to motorists when the bicycle is perpendicular to the road. Bicycle users frequently employ front and rear oriented reflectors which are fixedly mounted to the bicycle frame. Such fixed reflectors, however, can be mistaken as mailboxes or posts along the road by vehicle drivers, since bicycles generally travel at a slow speed relative to motor vehicles.

A variety of wheel-mounted bicycle reflector apparatus have been disclosed which seek to provide front and rear visibility. For example, U.S. Pat. No. 3,924,928 discloses an attachment for reflectors for spoke wheels in which a double faced reflectorized construction has a slot for engaging a standard spoke mounted reflector at a right angle, thus providing front and rear reflection. U.S. Pat. No. 4,178,070 discloses a bicycle safety apparatus wherein reflector assemblies having back to back reflective surfaces which extend outward beyond the wheel rim are mounted between the spokes of a wheel. U.S. Pat. No. 3,894,786 discloses a 360° viewable vehicular reflector flashing system which includes spoke-mounted reflectors with front and rear-oriented reflecting surfaces. U.S. Pat. No. 3,895,855 discloses an end-viewable spoke mounted reflector which extends outward from the spokes to provide front and rear reflection. U.S. Pat. No. 4,718,743 discloses a reflector mounted on a single spoke with tab means. U.S. Pat. No. 4,140,368 discloses an in-line revolving safety reflector assembly having planar reflectors attached between the spokes of a wheel so that the reflector surfaces are oriented towards the front and rear of the bicycle. U.S. Pat. No. 3,894,790 discloses a 360° viewable reflectorized vehicle wherein a plurality of wide angle reflectors are attached to both the frame and the spokes of a bicycle. U.S. Pat. No. 3,684,347 discloses a wheel spoke mounted reflector in which reflector attachments are mounted and fastened on selected spokes of a vehicle wheel. U.S. Pat. No. 3,310,357 discloses a rotating reflector for mounting in the spokes of a wheel wherein spur- or star-shaped reflectorized apparatus are affixed between adjacent spokes of a bicycle wheel.

A significant deficiency in the devices indicated above is that they are of fixed size, and a particular reflector apparatus may not fit between the forks of a particular bicycle frame, or may not provide front and rear visibility around a particular tire size. To optimize front and rear reflection while still fitting within the frame, bicycle users must carefully measure the distance between the forks of the bicycle frame and the tire width before purchasing these apparatus. Otherwise, the bicycle user may acquire a reflective apparatus which does not clear the bicycle frame or is too small to be visible around the tire from the front or rear. This problem has become particularly significant in recent years as rugged-terrain or mountain bicycles, which have a wide variety of frame sizes and tire widths, have become increasingly popular. Additionally, many of the background art reflective apparatus have attachment means that do not allow the apparatus to be fixed close to the wheel rim where the maximum motion of the reflector will create the most visibility.

Therefore, there is a need for a light reflecting safety apparatus for bicycles which attaches to the wheel, which maximizes front and rear reflective surface area while still clearing bicycle frame, which is adjustable to accommodate different bicycle frame and tire sizes, and which has attachment means allowing positioning near the wheel rim. The present invention satisfies these needs, as well as others, and overcomes the deficiencies found in the background art apparatuses.

The foregoing patents reflect the state of the art of which the applicant is aware and are tendered with the view toward discharging applicant's acknowledged duty of candor in disclosing information which may be pertinent in the examination of this application. It is respectfully stipulated, however, that none of these patents teach or render obvious, singly or when considered in combination, applicant's claimed invention.

SUMMARY OF THE INVENTION

The present invention pertains generally to a spoke mounted reflective safety apparatus for bicycles. Reflective wings on the apparatus allow maximization of the front and rear reflective surface areas within the clearance provided by a bicycle frame.

By way of example, and not of limitation, the reflecting apparatus includes first, second, and third reflective members. The first reflective member has two, generally parallel, reflective faces. The second and third reflective members have two, generally parallel, faces but only one face of each of said second and third reflective members is reflective. The first reflective member includes means for detachable coupling to a wheel spoke. The second and third reflective members or "wings" extend outward from the first reflective member so that the faces of the second and third reflective members are in a substantially perpendicular orientation to the faces of the first reflective member, and so that the longitudinal axis of each is aligned with the longitudinal axis of the first reflective member. Means for attaching second and third reflective members to the first reflective member are also included, whereby the second and third reflective members can be fixed in position or, preferably, are slidably adjustable in relation to the first reflector member.

Because the second and third reflective members will be oriented outward toward the wheel rim, the present invention provides for superior reflection from any direction around the bicycle. A change in direction of the bicycle can be clearly seen, particularly from the front to rear as the tires and reflectors become offset when turning. The wheel and reflector furthest from the approaching vehicle (front wheel and reflector if approaching from the rear) is effectively hidden by the close wheel when the bicycle is travelling straight ahead. As the bicycle turns, the wheels become offset exposing the furthest tire and reflector thus indicating direction. If a bicycle is weaving, as is common in the case of small children, the front/rear wheel related offset effectively indicates this pattern.

The invention also provides an indication of the relative speed of the bicycle, and placement close to the wheel rim is an important factor for giving an accurate speed indication. Additionally, the invention provides an indication of the relative size of the tire and, therefore, the bicycle. This gives an indication of whether the bicycle is a child or adult size and expected riding behaviors. Further, placement of the invention adjacent to the wheel rim maximizes exposure time as the wheel rotates, thereby providing greater visibility, since the diameter of the circle described by the reflector is largest.

Significantly, from the front to the rear of the bicycle, the one-sided reflective wings create a mono-directional strobe like flashing effect. From the rear, the strobe like flashing moves upward. From the front, the strobe like flashing moves down. This is achieved by only the wing side facing away from the wheel hub (toward the rim and tire) being reflective. This is an important characteristic of the invention and avoids confusing visual signals.

An object of the invention is to provide a light reflecting safety apparatus for a cycle wheel which provides front and rear oriented reflective surfaces.

Another object of the invention is to provide a light reflecting safety apparatus for a cycle wheel which can be affixed to the wheel spokes near the wheel rim.

Another object of the invention is to provide a light reflecting safety apparatus for a cycle wheel in which the outward extension of the second and third reflective members relative to the first reflective member is adjustable.

Another object of the invention is to provide a light reflecting safety apparatus for a cycle wheel in which the second and third reflective members are made of resilient or flexible material so that the reflectors do not shatter when stressed.

Another object of the invention is to provide a light reflecting safety apparatus for a cycle wheel in which reflective members are made of a resilient or flexible material which will not cause injury to a person contacting those reflective members while in motion.

Another object of the invention is to provide a light reflecting safety apparatus for a cycle wheel in which reflective means covering the reflective faces of the first and second reflective members can be trimmed by the bicycle user into desired configurations.

Another object of the invention is to increase visibility to automobile headlights from any direction.

Another object of the invention is to provide an indication of direction of travel of a bicycle from any position around the bicycle.

Another object of the invention is to provide an indication of the relative speed and size of a bicycle.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrated purposes only:

FIG. 4 is a left side elevation view of the apparatus of FIG. 1 partially exploded to show the wing attaching pop pins disengaged, and showing the apparatus in relation to a wheel spoke shown in phantom.

FIG. 5 is a right side elevation view of the apparatus shown in FIG. 4.

DESCRIPTION OF THE PREFERRED EMBODIMENTS

Figure 1:
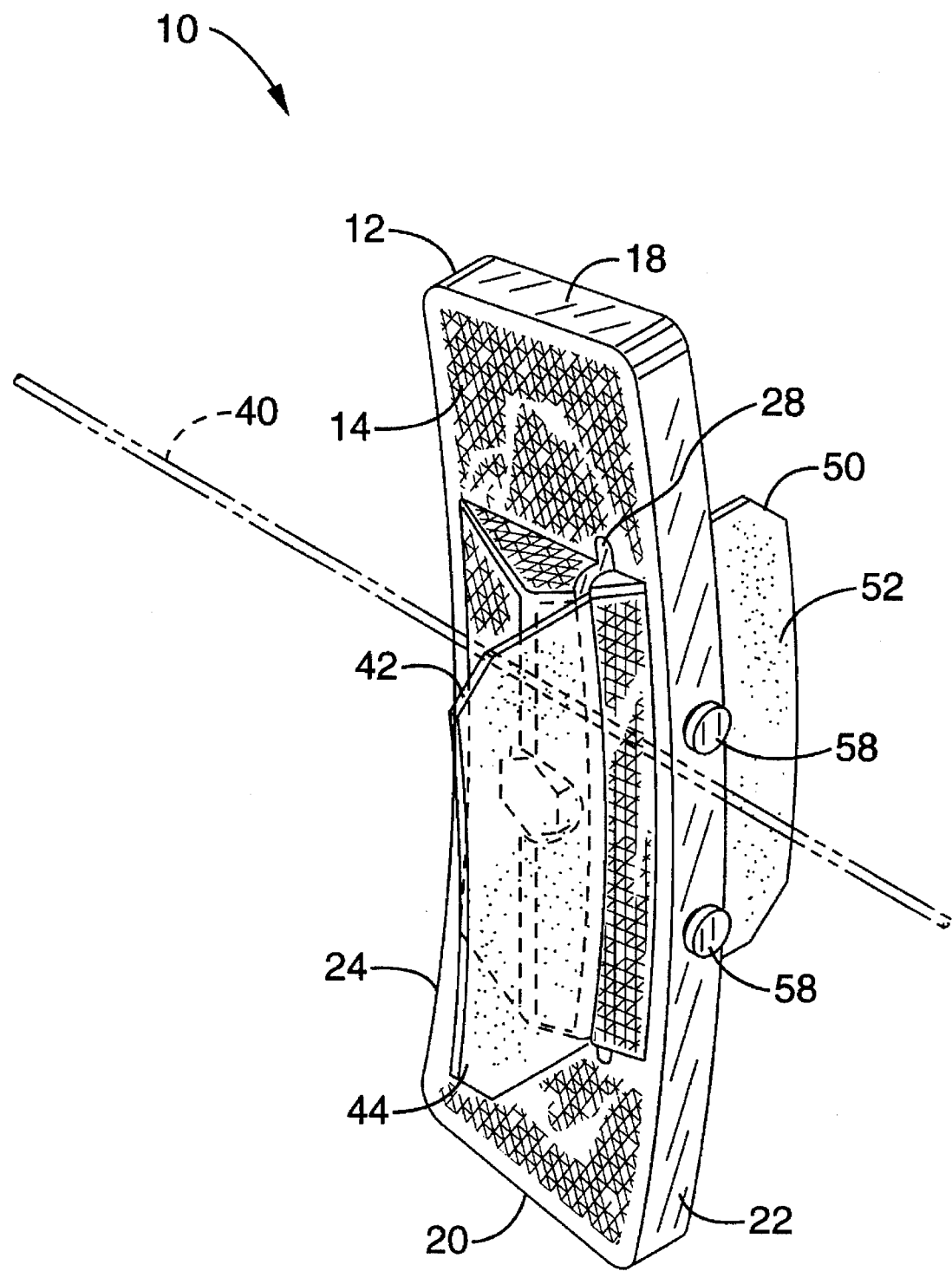
FIG. 1 is a perspective assembled view of a light reflecting bicycle safety apparatus in accordance with the present invention.

Referring now more specifically to the drawings, for illustrative purposes the present invention is embodied in the apparatus which is generally shown in FIG. 1 through FIG. 7. It will be appreciated that the apparatus may vary as to configuration and as to details of the parts without departing from the basic concepts as disclosed herein.

Referring to FIG. 1 through FIG. 5, the present invention generally comprises a light reflecting apparatus 10 for providing front and rear visibility. A first reflective member 12, preferably of a rectangular shape, includes a first face 14, a second face 16 a first end 18 and a second end 20, and a first edge 22 and a second edge 24. As shown, the first reflective member is slightly arcuate in shape to conform to the are of cycle wheel rim 26. However, non-rectangular and non-arcuate shapes are also contemplated. First reflective member 12 is also shown as having an optional elongated, protrusion 27 along first and second faces 14, 16, to increase the reflective surface area and angle of side reflection. It is contemplated that protrusion 27 could also consist of additional reflectors forming a pyramidal or other protruding shape on first face 14. First reflective member includes an elongated longitudinal slot 28 extending between first and second faces 14, 16. Slot 28 is preferably slightly arcuate in configuration so that slot 28 runs generally parallel to first and second edges 22, 24.

Figure 3:
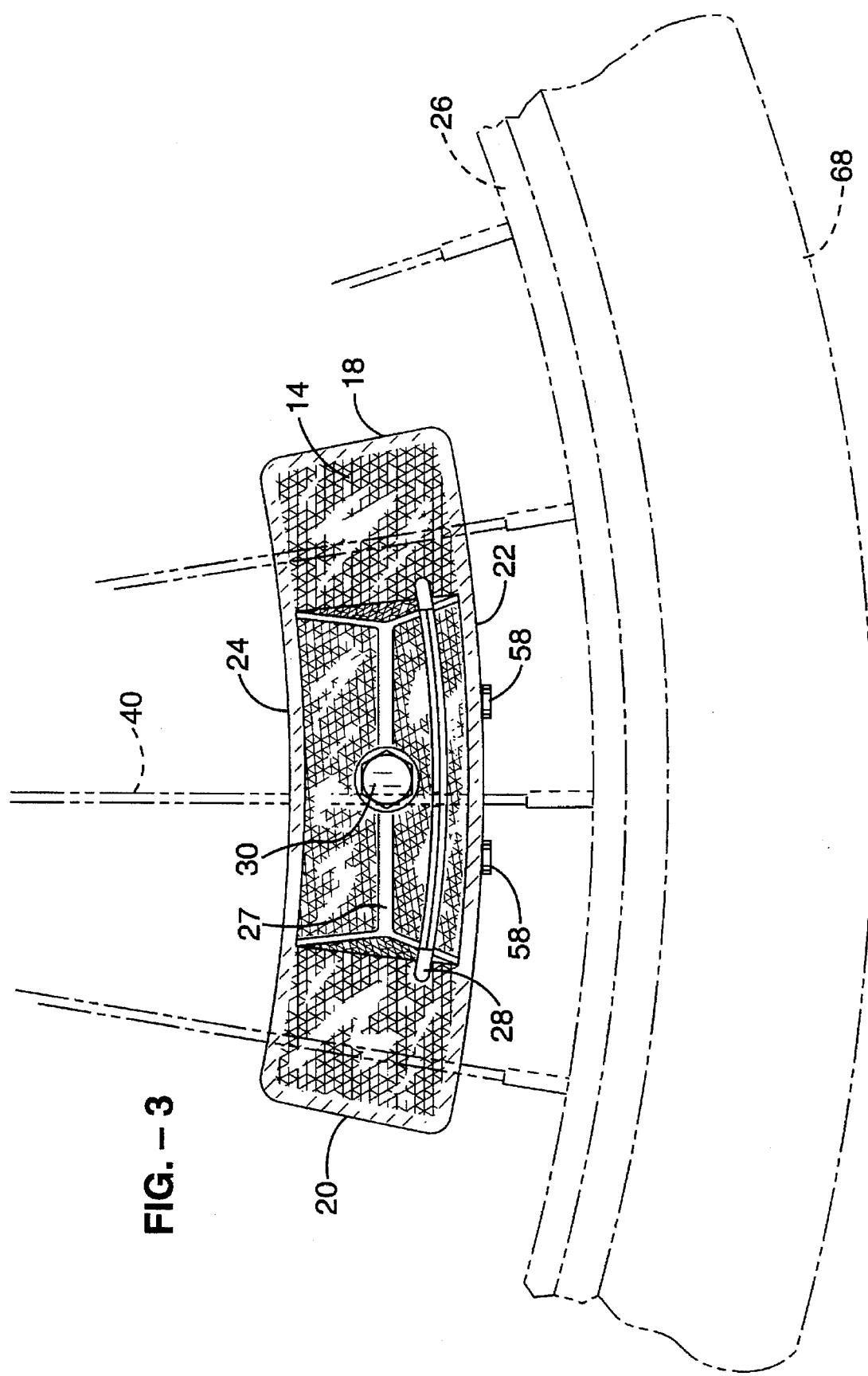
FIG. 3 is a side elevation view of the apparatus of FIG. 1 shown coupled to a spoke of a wheel shown in phantom.

Means for coupling first reflective member 12 to the spokes of a cycle wheel preferably includes bolt 30, nut 32, and washer 34, which are accommodated in bore 36 in first reflective member 12. Groove 38 in first reflective member 12 is structured and configured to conform to a cycle wheel spoke 40. Tightening bolt 30 and nut 32 in bore 36 holds spoke 40 into groove 38, and thus couples the reflective device 10 to the bicycle wheel by friction. Other spokes 40 of the bicycle wheel may press against first and or second face 14, 16 of first reflective member 12, as shown in FIG. 3, thereby aiding in holding the reflective apparatus 10 in position. Clips, clamps, ties, spot welds, adhesives, and other coupling means for reflectors on cycle wheel spokes are also considered as within the scope of the present disclosure.

Figure 6:
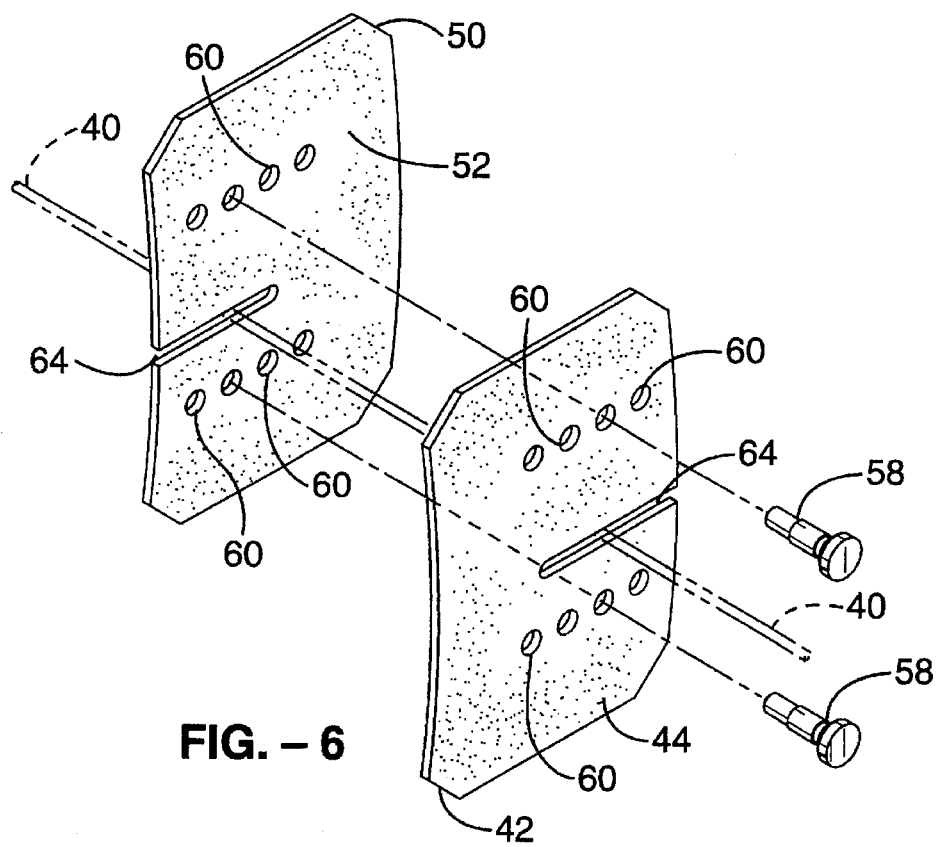
FIG. 6 a perspective view in exploded form of an embodiment of the reflective wings of the apparatus shown in FIG. 1.
Figure 7:
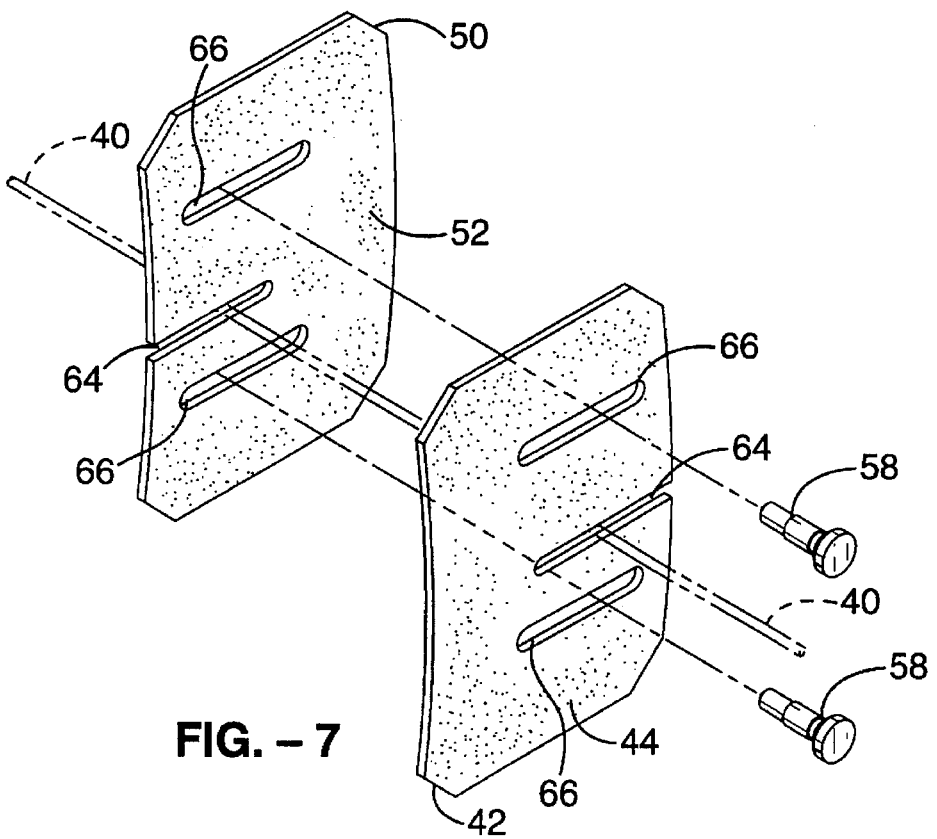
FIG. 7 a perspective view in exploded form of an alternative embodiment of the reflective wings shown in FIG. 6.

Referring to FIG. 6 and FIG. 7 as well as FIG. 1 through FIG. 5, a second reflective member 42 includes a face 44, a second face (not shown), a first end 46 and a second end 48. Preferably, second reflective member 42 is of a generally flat rectangular shape. Third reflective member 50 includes a first face 52, a second face (not shown), a first end 54 and a second end 56. Preferably, third reflective 50 member is also of a generally flat rectangular shape and of the same general size of second reflective member. Preferably, second and third reflective members 42, 50 are thin and fabricated from a resilient or flexible material so that they do not break or crack when stressed. For example, polyethylene, polypropylene, polyurethane, or other like flexible or pliant polymeric sheet material may be utilized for making second and third reflective members 42, 50 so that second and third reflective members 42, 50 will reversibly or elastically bend, rather than crack or shatter, when subjected to stress. The flexible material used should also be soft enough or otherwise workable so as to allow the user to cut or trim the second and third reflective members 42, 50 with scissors or a knife into desired shapes and sizes as required for use with particular bicycles. Second and third reflective members 42, 50 each are substantially thinner or less thick in cross-section than first reflective member 12, as can be seen most clearly in FIG. 1 and FIG. 2. Second and third reflective members 42, 50 each preferably have a cross-sectional thickness or distance between opposite faces of about one fifth or less of the cross-sectional thickness or distance between opposite faces 14, 16, of first reflective member 12. The thin construction of second and third reflective members 42, 50 relative to first reflective member 12 increases or enhances the flexibility of second and third reflective members 42, 50.

Second and third reflective members 42, 50 are structured and configured to slidably engage each other within slot 28 so that the faces of second and third reflective members are substantially perpendicular to the faces of first reflective member. While engaged in slot 28, first face 52 of third reflective member 50 is generally positioned adjacent second face (not shown) of second reflective member 42, with first and second ends 46, 48 of second reflective member 42 aligned with first and second ends 54, 56 respectively of third reflective member 50. Alternatively, second face (not shown) of third reflective member 50 could be slidably engaged adjacent to first face 44 of second reflective member.

Figure 2:
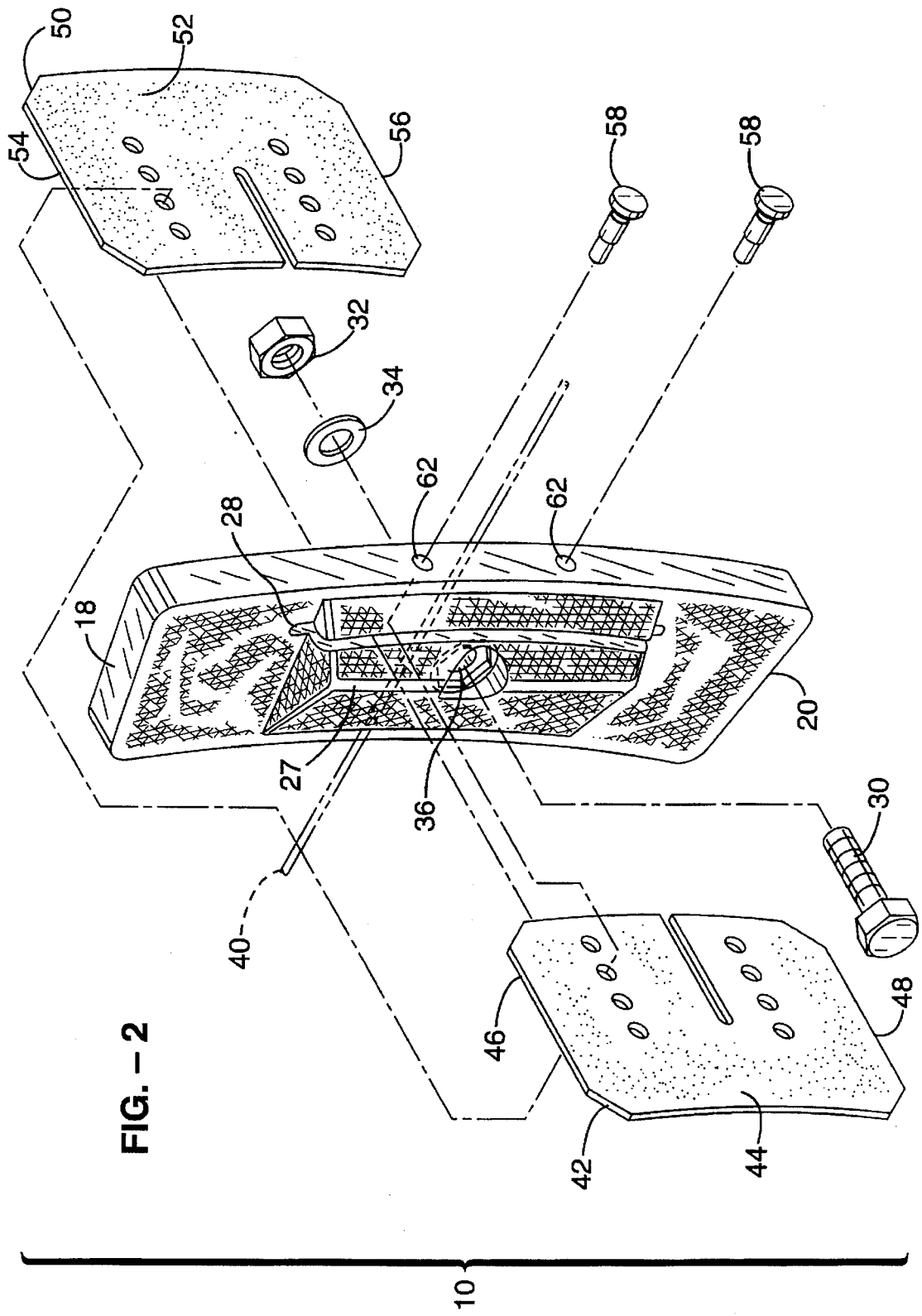
FIG. 2 is an exploded view of the apparatus of FIG. 1 shown in relation to a wheel spoke shown in phantom.

Means for attaching second and third reflective members 42, 50 to first reflective member 12 are preferably in the form of pop-pins 58 and a plurality of holes 60 in second and third reflective members 42, 50, as shown in FIG. 2 and FIG. 6. Holes 60 are structured and configured to reversibly engage pop-pins 58 by friction. First reflective member 12 includes bores 62 which accommodate pop-pins 58 so that second and third reflective members 42, 50 may be affixed thereto in a substantially perpendicular orientation. Second and third reflective members 42, 50 further include slot 64 through which a spoke of a cycle wheel fits when second and third reflective members are attached to first reflective member 12.

The aforementioned attachment means also serves as means for adjustably extending the position of second and third reflective members 42, 50 inward or outward relative to the faces 14, 16 of first reflective member 12. The bicycle user has merely to choose which holes 60 should be aligned together when second and third reflective members 42, 50 are slidably engaged. FIG. 7 shows an alternative embodiment wherein holes 60 are replaced by slots 66 which are also structured and configured to reversibly engage pop-pins 58 by friction.

In using the light reflecting safety device which comprises the present invention, the bicycle user measures the distance between the forks of the bicycle frame (not shown) to determine the desired positional adjustment for second and third reflective members 42, 50. Second and third members are slidably engaged within slot 28 in a position so that spoke 40 fits within groove 38, and the members clear the forks of the frame when the wheel is rotated. The appropriate holes 60 in second and third reflective members 42, 60 are then aligned. Pop-pins 58 are then mounted in bores 62 of first reflective member 12 and engaged in holes 60 so that second and third reflective members 42, 50 are affixed in a substantially perpendicular position relative to first reflective member 12. Note also that the longitudinal axis between ends 46, 48 of second reflective member 42, the longitudinal axis between ends 54, 56 of third reflective member 50, and the longitudinal axis between ends 18, 20 of first reflective member 12 are aligned to provide the same lengthwise orientation. Second and third reflective members 42, 50 thus act as adjustable wings and provide maximum front and rear visibility obtainable for any particular bicycle frame and tire arrangement, which is difficult or impossible to achieve using currently available wheel mounted reflective devices. The arcuate shape of the first reflective member 12, which is imparted to the resilient second and third reflective members when they are engaged in slot 28, allows attachment of the invention 10 close to the wheel rim 26, providing the maximum stroboscopic or flashing effect, which cannot always be achieved with the prior art devices.

Since second and third reflective members 42, 50 are preferably made of resilient material, resilient reflective means are also preferably employed on the reflective surfaces of these members. For example, reflective tapes such as TRIMBRITE® of Spartan International Inc., Scotch™ Reflective tape of 3M Co., or other resilient reflective material, may be used. In this way, both the second and third reflective members 42, 50 and the reflective material may be trimmed by the user to any desired size and shape. Alternatively, other reflective means, such as reflective paint or coating, may be employed. Different reflective colorations or patterns may be used on the different faces if desired.

The light reflecting safety apparatus for cycle wheels disclosed herein can be used to indicate the direction and speed of the bicycle by providing reflective means on only the outwardly directed faces of second and third reflective members 42, 50. For example, including reflecting means on only the first face 44 of second reflective member 42 and first face 52 of second reflective member 50, which both point outward towards wheel rim 26 in the same direction as shown in FIG. 1, and not on the inward facing second faces (not shown), a mono-directional strobe-like flashing effect is achieved. From the front, the moving bicycle would present reflective surfaces which move in a generally downward direction, and from the rear, the moving bicycle would present generally upward moving reflective surfaces. Thus, motorists would be apprised of whether a bicycle was approaching or retreating relative to the motor vehicle. Similarly, a more rapid flashing pattern would indicate a bicycle travelling at relatively fast speed. Changes in direction of travel by a bicycle are also easily detected with use of the present invention 10.

Figure 8:
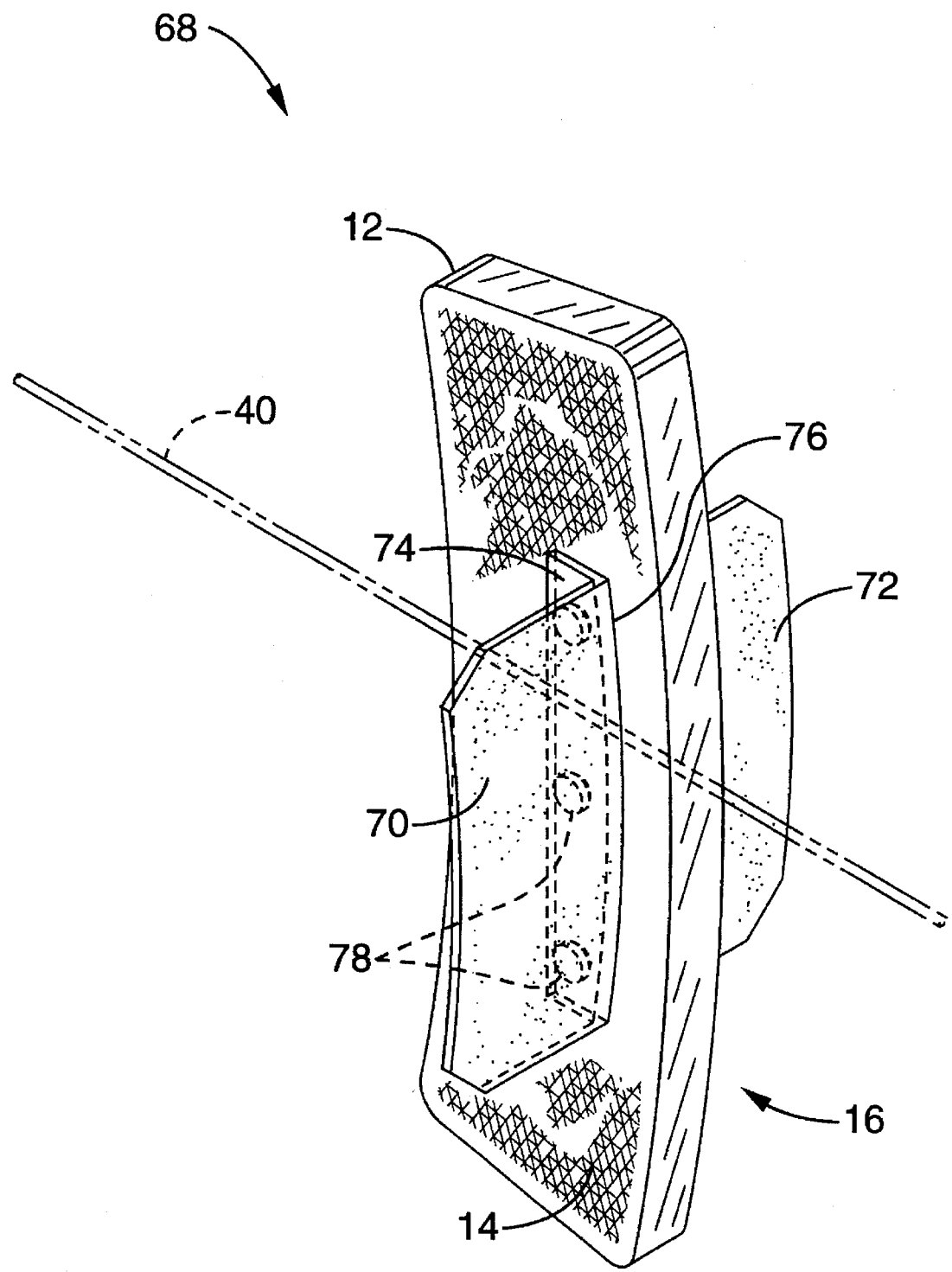
FIG. 8 is a perspective view of a second embodiment light reflecting bicycle safety apparatus in accordance with the present invention.

The light reflecting safety apparatus for cycle wheels which comprises the present invention also provides indication regarding the size and age of the bicyclist, thus warning motorists of the possible presence of a child. Small cycle wheels such as those on bicycles used by children create a different flashing pattern than appears from the larger wheels used on adult-sized bicycles. If the bicycle is weaving, as is common for small children, the light reflecting safety apparatus indicates this motion pattern. Referring now to FIG. 8, a second embodiment light reflecting bicycle safety apparatus 68 in accordance with the present invention is generally shown, wherein like reference numbers denote like parts. The light reflecting bicycle safety apparatus 68 comprises second and third reflective members 70, 72 which are coupled directly to first reflective member 12. Second reflective member 70 includes a base portion or tab 74 which extend along inner edges 76 of reflective member 70. Base portion 74 is oriented at generally a right angle with respect to reflective member 70. Third reflective member 72 includes a like base portion which is not shown. Second reflective member 70 is coupled directly to first face 14 of first reflective member 12, preferably by means of a plurality of pins or fasteners 78 which extend through corresponding bores (not shown) in base portion 74 and into receiving bores (not shown) in first reflective member 12. Third reflective member 72 likewise is coupled directly to second face 16 of first reflective member by a plurality of fasteners and corresponding bores (not shown). Screws, pins, clips, clamps, adhesives, or like coupling means may alternatively be used to join second and third reflective members 70, 72 to first reflective member 12. Base portion 74 of second reflective member 70 may be omitted, and the inner edge 76 of second reflective member can be joined or coupled directly to face 14 of first reflective member 12 by means of adhesives, and likewise with third reflective member 72. Second and third reflective members 70, 72 are preferably made from thin, resilient reflective sheet material which can be cut or trimmed with scissors or a knife. Second and third reflective members 70, 72 preferably are substantially thinner in cross section than first reflective member 12, to facilitate trimming of reflective members 70, 72 to desired size and shape and to prevent injury to users when reflective members undergo rapid motion due to bicycle wheel rotation.

The light reflecting bicycle safety apparatus 68 operates in generally the same manner as described above for light reflecting bicycle safety apparatus 10, except that second and third reflective members 70, 72 are fixedly mounted onto first reflective member 12 and cannot undergo slidable positioning. Since second and third reflective members 70, 72 are made of a resilient, trimmable sheet material, second and third reflective members 70, 72 can be cut or trimmed to fit individual bicycles as required.

Figure 9:
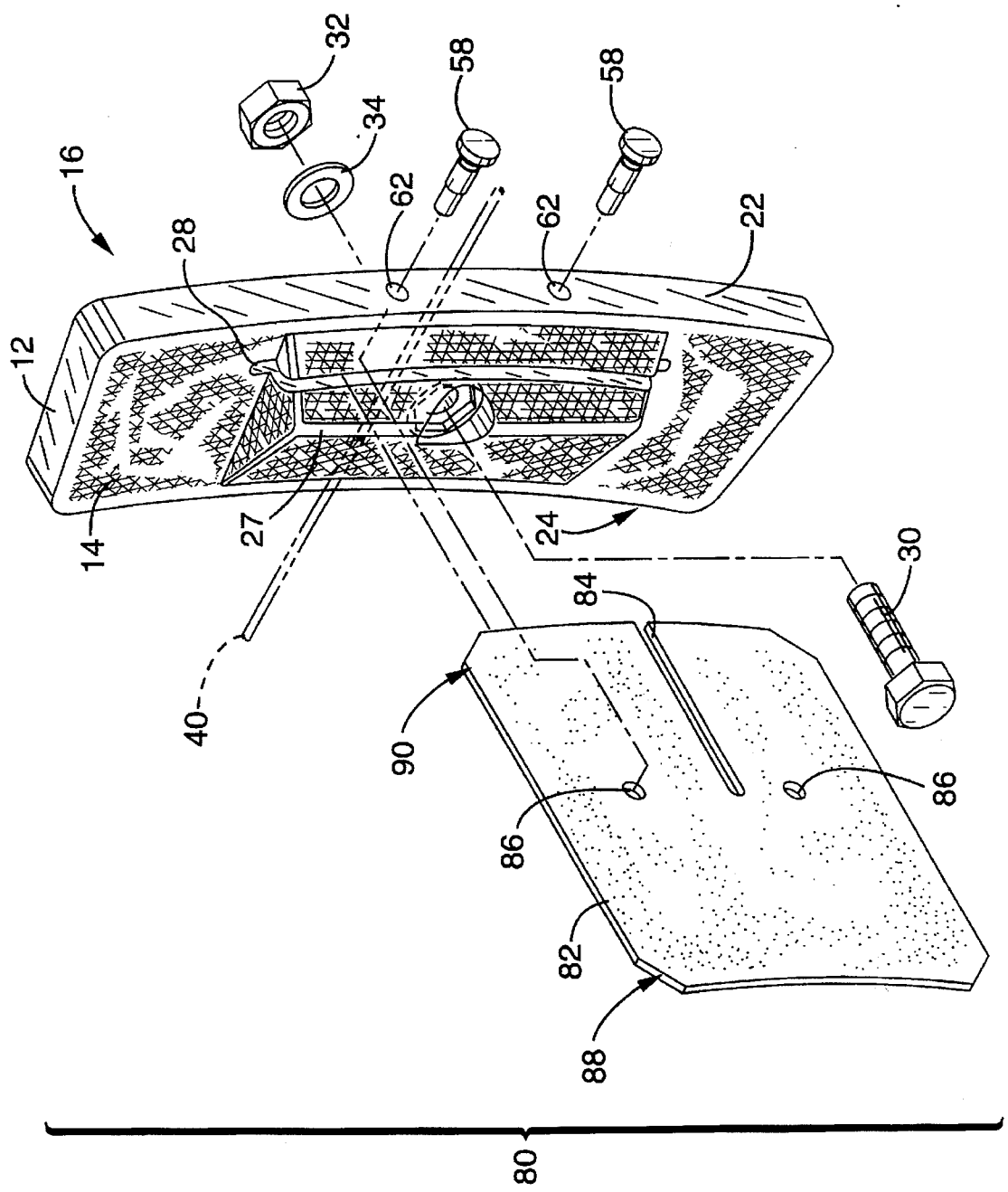
FIG. 9 is an exploded perspective view of a third embodiment light reflecting bicycle safety apparatus in accordance with the present invention.

Referring next to FIG. 9, a third embodiment light reflecting bicycle safety apparatus 80 is generally shown wherein like reference numerals denote like parts. The light reflecting bicycle safety apparatus 80 includes a single second reflective member or wing 82 which is mounted within slot 28 in first reflective member 12. Second reflective member 82 is of generally thin, resilient construction, and preferably is substantially thinner in cross-section than first reflective member 12. Second reflective member or wing 82 is preferably made of flexible reflective sheet material which can be cut or trimmed to a desired size and/or shape according to the particular bicycle used with the invention.

Second reflective member 82 slidably engages slot 28 in first reflective member 12, with slot 84 in second reflective member 82 accommodating spoke 40. Pins 58 extend through bores 62 in first reflective member 12 and engage corresponding holes 86 in second reflective member 82. Second reflective member or wing 82 generally includes first and second reflective segments 88, 90. When second reflective member 82 is engaged in slot 28 of first reflective member 12, first reflective segment 88 is generally adjacent to and perpendicular to face 14 of first reflective member 12, and second reflective segment 90 is generally adjacent to and perpendicular to face 16 of first reflective member 12, with second reflective member 82 being centrally positioned with respect to first reflective member 12 so that first reflective segment 88 and second reflective segment 90 extend outward at substantially equal distances from first and second faces 14, 16 respectively of first reflective member 12. Second reflective member 82 may alternatively be attached to front or back edges 22, 24 of first reflective member 12 such that first and reflective segments 88, 90 extend perpendicularly outward from first and second faces 14, 16 respectively of first reflective member 12.

The light reflecting bicycle safety apparatus 80 operates in generally the same manner as described above for light reflecting bicycle safety apparatus 68, with the primary exception being that second reflective member 82 is engaged within slot 28 in first reflective member 12 such that first and second reflective segments 86, 88 are fixedly mounted adjacent faces 14, 16 respectively of first reflective member 12. The second reflective member or wing 82 is centrally positioned within slot 20 and, since second reflective member 82 is made of a resilient, trimmable sheet material, first and second reflective segments 88, 90 can be cut or trimmed to fit individual bicycles as required. In all other respects, the apparatus 80 is used in the manner described above.

Accordingly, it will be seen that this invention provides a light reflecting safety apparatus for a cycle wheel which provides reflective surfaces with front and rear visibility, which is adjustable to fit various bicycle frame sizes, and which can be positioned near a wheel rim to maximize visibility. Although the description above may contain many specificities, these should not be construed as limiting the scope of the invention but as merely providing illustrations of some of the presently preferred embodiments of this invention. Thus the scope of this invention should be determined by the appended claims and their legal equivalents.

I claim:

1. A light reflecting apparatus for attachment to a cycle wheel of the type having a plurality of spokes, comprising:

(a) a first reflective member, said first reflective member having first and second faces, said first reflective member having first and second ends;

(b) a second reflective member, said second reflective member having first and second faces, said second reflective member having first and second ends, said second reflective member constructed of flexible material, said second reflective member substantially thinner in cross-section than said first reflective member;

(c) a third reflective member, said third reflective member having first and second faces, said third reflective member having first and second ends, said third reflective member constructed of flexible material, said third reflective member substantially thinner in cross-section than said first reflective member;

(d) said second and third reflective members extending outward from said first reflective member in a substantially perpendicular orientation in relation to said faces of said first reflective member, said first and second ends of said second and third reflective members being longitudinally aligned with said first and second ends of said first reflective member, said faces of said second and third reflective members being substantially perpendicular to said faces of said first reflective member; and (e) means for coupling said first reflective member to a wheel spoke.

2. An apparatus as recited in claim 1, wherein said second and third reflective members include spoke guide means for receiving a wheel spoke.

3. An apparatus as recited in claim 1, said first reflective member including slot means for receiving said second and third reflective members.

4. An apparatus as recited in claim 3, wherein said first reflective member includes a plurality of bores extending through said first reflective member and into said slot means.

5. An apparatus as recited in claim 4, further comprising a plurality of pins, said pins extending through said bores and into said second and third reflective members.

6. An apparatus as recited in claim 1, wherein said first reflective member includes a first longitudinal edge and a second longitudinal edge, said first longitudinal edge being generally parallel to said second longitudinal edge, said first and second faces of said second reflective member being generally parallel to said first longitudinal edge and said second longitudinal edge of said first reflective member, said first and second faces of said third reflective member generally parallel to said first longitudinal edge and said second longitudinal edge of said first reflective member.

7. An apparatus as recited in claim 1, wherein said means for coupling said first reflective member to a wheel spoke comprises a removable clamp.

8. An apparatus as recited in claim 1, wherein said second reflective member is coupled to said first face of said first reflective member, and said third reflective member is coupled to said second face of said first reflective member.

9. An apparatus as recited in claim 1, wherein said second and third reflective members each include an inner edge, said second reflective member coupled to said first face of said first reflective member adjacent said inner edge, and said third reflective member coupled to said second face of said first reflective member adjacent said inner edge.

10. An apparatus as recited in claim 1, wherein said second and third reflective members are integral portions of a single piece of said flexible material.

11. A light reflecting safety apparatus for a cycle wheel, comprising:

(a) a first reflective member, said first reflective member having a first reflective face and a second reflective face;

(b) a second reflective member, said second reflective member extending outward from said first reflective face of said first reflective member;

(c) a third reflective member, said third reflective member extending outward from said second reflective face of said first reflective member;

(d) said second and third reflective members slidably coupled to said first reflective member;

(e) means for adjusting the extended position of said second and third reflective members in relation to said first reflective member; and (f) means for coupling said first reflective member to a spoke of a wheel.

12. An apparatus as recited in claim 11, wherein said first, second and third reflective members have first and second ends, each said member has a longitudinal axis extending between said respective first and second ends, and said longitudinal axes of said first, second and third reflective members are substantially parallel.

13. An apparatus as recited in claim 11, wherein said second and third reflective members include spoke guide means for receiving a wheel spoke.

14. An apparatus as recited in claim 11, wherein said means for adjusting the extended position of said second and third reflective members in relation to said first reflective member comprises:

(a) slot means for receiving said second and third reflective members.

(b) a plurality of bores extending through said first reflective member and into said slot means; and (c) a plurality of removable pins, said pins extending through said bores and into said second and third reflective members.

15. An apparatus as recited in claim 11, wherein said first reflective member includes a first longitudinal edge and a second longitudinal edge, said first longitudinal edge being generally parallel to said second longitudinal edge, said first and second faces of said second reflective member being generally parallel to said first longitudinal edge and said second longitudinal edge of said first reflective member, said first and second faces of said third reflective member generally parallel to said first longitudinal edge and said second longitudinal edge of said first reflective member.

16. An apparatus as recited in claim 11, wherein said means for coupling said first reflective member to a wheel spoke comprises a removable clamp.

17. A light reflecting safety apparatus for attachment to the spoke of a cycle wheel, comprising:

(a) a first reflective member, said first reflective member having a first reflective face and a second reflective face;

(b) an arcuate second reflective member, said second reflective member extending outward from said first reflective face of said first reflective member, said second reflective member having a reflective face, said reflective face of said second reflective member oriented substantially perpendicular to said first reflective face of said first reflective member;

(c) an arcuate third reflective member, said third reflective member extending outward from said second reflective face of said first reflective member, said third reflective member having a reflective face, said reflective face of said third reflective member oriented substantially perpendicular to said second reflective face of said first reflective member;

(d) said reflective face of said second reflective member and said reflective face of said third reflective member facing outward in the same direction;

(e) said second and third reflective members slidably coupled to said first reflective member;

(f) means for adjusting said second and third reflective members to a plurality of positions in relation to said first reflective member; and (g) means for coupling said first reflective member to a spoke of a wheel.

18. An apparatus as recited in claim 17; wherein said first, second and third reflective members have first and second ends, each said member has a longitudinal axis extending between said respective first and second ends, and said longitudinal axes of said first, second and third reflective members are substantially parallel.

19. An apparatus as recited in claim 17, wherein said second and third reflective members include spoke guide means for receiving a wheel spoke.

20. An apparatus as recited in claim 17, wherein said means for adjusting said second and third reflective members to a plurality of positions in relation to said first reflective member comprises:

(a) slot means for receiving said second and third reflective members.

(b) a plurality of bores extending through said first reflective member and into said slot means; and (c) a plurality of removable pins, said pins extending through said bores and into said second and third reflective members.

21. An apparatus as recited in claim 17, wherein said first reflective member includes a first longitudinal edge and a second longitudinal edge, said first longitudinal edge being generally parallel to said second longitudinal edge, said first and second faces of said second reflective member being generally parallel to said first longitudinal edge and said second longitudinal edge of said first reflective member, said first and second faces of said third reflective member generally parallel to said first longitudinal edge and said second longitudinal edge of said first reflective member.

22. An apparatus as recited in claim 17, wherein said means for coupling said first reflective member to a wheel spoke comprises a removable clamp.

23. A light reflecting apparatus for attachment to a cycle wheel of the type having a plurality of spokes, comprising:

(a) a first reflective member, said first reflective member having first and second faces, said first reflective member having first and second ends;

(b) a second reflective member, said second reflective member having first and second faces, said second reflective member having first and second ends;

(c) a third reflective member, said third reflective member having first and second faces, said third reflective member having first and second ends;

(d) said second and third reflective members extending outward from said first reflective member in a substantially perpendicular orientation in relation to said faces of said first reflective member, said first and second ends of said second and third reflective members being longitudinally aligned with said first and second ends of said first reflective member, said faces of said second and third reflective members being substantially perpendicular to said faces of said first reflective member, said second and third reflective members including spoke guide means for receiving a wheel spoke;

(e) said first reflective member including slot means for receiving said second and third reflective members; and (f) means for coupling said first reflective member to a wheel spoke.

24. A light reflecting apparatus for attachment to a cycle wheel of the type having a plurality of spokes, comprising:

(a) a first reflective member, said first reflective member having first and second faces, said first reflective member having first and second ends;

(b) a second reflective member, said second reflective member having first and second faces, said second reflective member having first and second ends, said second reflective member constructed of flexible material, said second reflective member substantially thinner in cross-section than said first reflective member;

(c) a third reflective member, said third reflective member having first and second faces, said third reflective member having first and second ends, said third reflective member constructed of flexible material, said third reflective member substantially thinner in cross-section than said first reflective member;

(d) said second and third reflective members extending outward from said first reflective member in a substantially perpendicular orientation in relation to said faces of said first reflective member, said first and second ends of said second and third reflective members being longitudinally aligned with said first and second ends of said first reflective member, said faces of said second and third reflective members being substantially perpendicular to said faces of said first reflective member;

(e) said first reflective member including slot means for receiving said second and third reflective members; and (f) means for coupling said first reflective member to a wheel spoke.

25. An apparatus as recited in claim 24, wherein said second and third reflective members include spoke guide means for receiving a wheel spoke.

26. An apparatus as recited in claim 24, wherein said first reflective member includes a plurality of bores extending through said first reflective member and into said slot means.

27. An apparatus as recited in claim 26, further comprising a plurality of pins, said pins extending through said bores and into said second and third reflective members.

28. An apparatus as recited in claim 24, wherein said first reflective member includes a first longitudinal edge and a second longitudinal edge, said first longitudinal edge being generally parallel to said second longitudinal edge, said first and second faces of said second reflective member being generally parallel to said first longitudinal edge and said second longitudinal edge of said first reflective member, said first and second faces of said third reflective member generally parallel to said first longitudinal edge and said second longitudinal edge of said first reflective member.

29. An apparatus as recited in claim 24, wherein said means for coupling said first reflective member to a wheel spoke comprises a removable clamp.

30. A light reflecting safety apparatus for a cycle wheel, comprising:

(a) a first reflective member, said first reflective member having a first reflective face and a second reflective face;

(b) a second reflective member, said second reflective member slidably coupled to said first reflective member, said second reflective member having first and second reflective segments, said first reflective segment extending outward perpendicularly from said first reflective face of said first reflective member, said second reflective segment extending outward perpendicularly from said second reflective face of said first reflective member; and (c) means for coupling said first reflective member to a spoke of a wheel.

31. An apparatus as recited in claim 30, wherein said first reflective member includes a longitudinal slot, said second reflective member slidably engaging said slot.

32. An apparatus as recited in claim 30, wherein said second reflective member is trimmable.

33. An apparatus as recited in claim 30, wherein said second reflective member is constructed of flexible material, and said second reflective member is substantially thinner in cross-section than said first reflective member.

34. An apparatus as recited in claim 30, wherein said second reflective member is centrally positioned with respect to said first reflective member so that said first reflective segment and said second reflective segment extend outward at substantially equal distances from said first and second reflective faces respectively of said first reflective member.

* * * * *